Jan. 2, 1951     C. SKLAREK     2,536,234
FOG LIGHT MOUNTING
Filed April 2, 1946
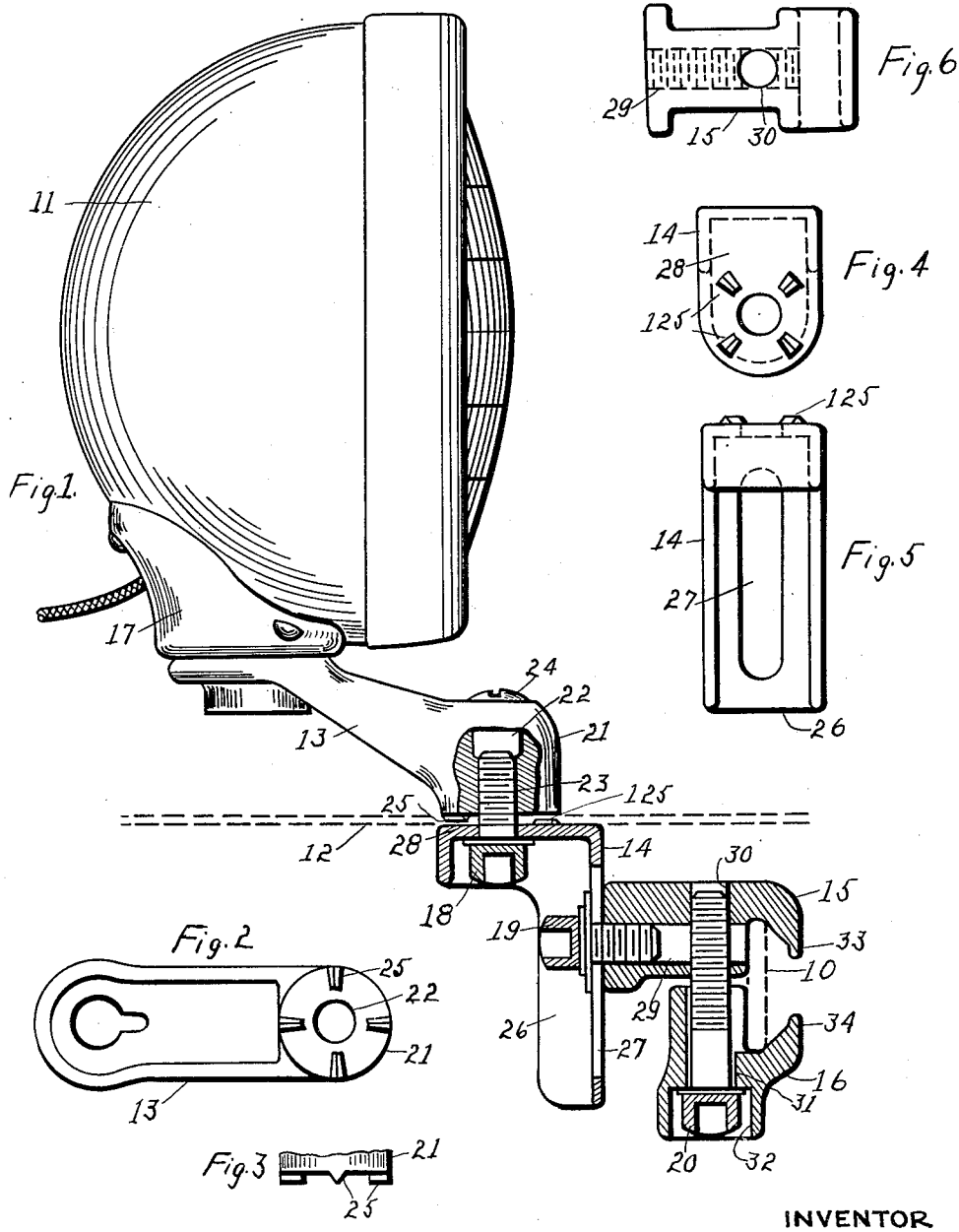
INVENTOR
Clifford Sklarek
PER Joseph Harris
ATTORNEY Patented Jan. 2, 1951                                                                2,536,234

UNITED STATES PATENT OFFICE 2,536,234

FOG LIGHT MOUNTING

Clifford Sklarek, Los Angeles, Calif.

Application April 2, 1946, Serial No. 659,086

4 Claims. (Cl. 248—226)

This invention relates to improvements in fog light mountings and, more especially, such mountings for automotive vehicles having bumper constructions wherein light gage metal pans are used between the bumper bar and front of the car to conceal the bumper supports.

Much difficulty has heretofore been experienced in providing a satisfactory attachment of so-called fog lights to certain modern automobiles where metal pans are used in association with the bumper bars, due to the fact that the pans are not of themselves of sufficient rigidity to adequately support the fog lights and, because the pans conceal the usual bumper bar supports, the latter could not be used without badly mutilating and destroying the appearance of the pans. In such types of bumper arrangements, also, the bumper bar itself is such that it seldom is available for securing the fog light brackets.

One object of the invention, therefore, is to provide an efficient mounting for fog lights which is readily adjustable to all the variable conditions of different automobile bumper arrangements utilizing metal pans and which can be applied without destroying or marring the appearance of the pans.

Another object of the invention is to provide a mounting of the character indicated in the preceding paragraph wherein the bumper pan is itself utilized to prevent unauthorized removal of the fog light after the latter has been attached.

Other objects of the invention will more clearly appear from the following description taken in connection with the accompanying drawing.

In said drawing, Fig. 1 is a part side elevational, part vertical sectional view of a fog light mounting embodying the preferred form of the invention showing the same in connection with a bumper support and pan, the two latter being indicated by dotted lines. Fig. 2 is a bottom plan of the bracket arm and Fig. 3 a broken side elevation of a portion thereof. Figs. 4 and 5 are top plan and rear elevation views, respectively, of the support employed in the invention. And Fig. 6 is a top plan view of one of the bracket clamps.

In said drawing 10 indicates in dotted lines one of the usual bumper supports, as distinguished from the bumper bar proper, 11 the light shell, and 12, in dotted lines, a portion of a pan such as now commonly found on automobiles.

The improved mounting, as shown, comprises, broadly, a bracket arm 13, an arm support 14, upper and lower clamping jaws 15 and 16, and securing bolts 18, 19, and 20.

To provide for universal adjustment of the light shell 11 with respect to the bracket arm 13, the latter and bearing saddle 17 riveted to the shell, will have cooperable spherical bearing surfaces with an associated retaining bolt which it is deemed unnecessary to be shown or described in detail other than to state that anti-theft provision with respect to the retaining bolt will be provided similar to those hereinafter described in connection with the bolts 18, 19, and 20.

Referring now to the bracket arm 13, the same is formed at its lower end adjacent the pan 12 with a hub-like section 21 vertically apertured at 22, the lower portion of the aperture being threaded at 23 to cooperate with the bolt 18 as shown and the top of the aperture being closed preferably by a screw plug 24 to seal the aperture from the weather. On its bottom face, the hub 21 is provided with a plurality of preferably radially and uniformly disposed, relatively shallow, wedge shaped lugs 25—25 for the purpose hereinafter described.

The arm support 14 is formed with a depending section 26 of approximately channel cross section, the web portion of which has an elongated, vertically arranged slot 27 therein to vertically and angularly adjustably accommodate the arm support 14 on the bolt 19 and with reference to the clamping jaw 15. The upper end of the arm support 14 is likewise of approximately channel cross section with the web portion 28 disposed horizontal to engage the under surface of the pan 12 and apertured for passage of the bolt 18 to the bracket arm 13. On its upper face, said web portion 28 is also provided with a plurality of preferably radially and uniformly disposed, relatively shallow, wedge shaped lugs 125—125 for the purpose hereinafter described. It will be noted that, as the parts are shown assembled in Fig. 1 and separate in Figs. 2 and 4, the lugs 25—25 are angularly offset relative to the lugs 125—125.

As it well known, the sheet metal used for bumper pans is of relatively very light gage, the primary function of such pans being for the sake of appearances only. With the present invention, use is made of this inherent light gage characteristic of such pans in the following manner. To prevent malicious removal of the light and associated bracket arm 13 from the bolt 18, it is essential to prevent the bracket arm from being rotated. This important function is accomplished by the cooperable sets of lugs 25 and 125 which, in conjunction with the light gage metal pan 12, sufficiently indent themselves into the pan sheet as to thereafter prevent relative rotation between the bracket arm 13 and arm support 14 after the bolt 18 has been screwed home. An additional preventive against theft is thus provided, as will be evident.

Referring next to the clamping jaws 15 and 16. The jaw 15, as shown, is provided with two threaded apertures 29 and 30 at right angles to each other for cooperation with the bolts 19 and 20, respectively. The lower jaw 16 is provided with a vertically disposed aperture 31 for the bolt 20 and, at its bottom end, with a cylindrical recess 32 providing a complete housing for the head of the bolt 20. The jaws 15 and 16 are provided also with opposed, hook-shaped lugs 33 and 34 engageable over the top and bottom edges of the bumper support 10 to secure the entire assembly thereto when the bolt 20 is tightened up, as will be obvious.

From the foregoing description, it will be seen that the jaws 15 and 16 are adjustable to accommodate various sized supports 10, and the slot 27 in arm support 14 with the bolt 19, permits all necessary vertical adjustments of the support to contact the pan, as well as being adjustable to meet any angular position of the bumper bar support relative to the pan.

To further minimize theft or tampering, each of the bolt heads is made cylindrical and provided with a socket, requiring a special tool for turning and adapted to have a lead or similar plug driven into each socket after the parts have been assembled, adjusted and tightened up. In this connection, it will be noted that each bolt head is housed so as to prevent the use of a pipe wrench or pliers thereon, the bolt 20 by the housing section of jaw 16 and the bolts 18 and 20 by the flanges of the channel cross sections of the arm support 14.

From the preceding description, it will be evident that the only operation required to apply the fog light mounting is the drilling or punching of a hole in the bumper pan at the desired location, thus preserving the appearance of the pan, while at the same time providing a proper rigid attachment to the bumper bar support and making the entire arrangement substantially theft proof by any ordinary means.

Although there has herein been shown and described what is now considered the preferred embodiment of the invention, the same is merely illustrative and all changes and modifications are contemplated that come within the scope of the appended claims.

What is claimed is:

1. A mounting for a light to an automotive vehicle bumper construction employing a bumper bar support and a sheet metal pan overlying such support, said mounting comprising; a light bracket arm disposable on and against the upper side of the pan, an arm support disposable beneath and against the pan, means including a clamping jaw, adapted to engage and clamp against the bumper bar support, a bolt cooperable with the bracket arm and arm support, and means for adjustably attaching the arm support to said clamping jaw, said bracket arm and arm support having cooperable means to indent the pan sheet to thereby prevent relative rotation of bracket arm and arm support when they are drawn together against the pan by tightening up of the bolt said adjustable means comprising an elongated slot in the arm support and a bolt extended therethrough into the clamping jaw whereby the arm support may be adjusted vertically and angularly relative to the bumper bar support.

2. A mounting for a light to a bumper construction employing a bumper bar support and a sheet metal pan overlying such support, said mounting comprising: a light bracket arm disposable on and engageable with the upper side of the pan; an arm support disposable beneath and engageable with the underside of the pan; means cooperable with the bracket arm and arm support for securing them together with the pan therebetween; a pair of relatively adjustable clamping jaws adapted to engage and be secured to the bumper bar support; and adjustable means for securing said arm support member to one of said jaw members, including a portion of one of said members having an elongated slot therein and a bolt extending through said slot and having threaded engagement with the other of said members whereby said arm support may be adjusted to correspond to varying distances between the bumper bar support and pan and also angularly adjusted to compensate for varying angular relationships between the pan and bumper bar support.

3. A mounting for a light to a bumper construction employing a bumper bar support and a sheet metal pan overlying such support, said mounting comprising: a light bracket arm disposable on and engageable with the upper side of the pan; an arm support disposable beneath the pan, said support having a horizontal section and an elongated vertical section, the latter having a vertically elongated slot therein; means cooperable with said bracket arm and horizontal section of the arm support for rigidly securing the same in fixed position with the pan clamped therebetween; adjustable clamping means engageable with the bumper bar support; and a securing bolt extending through said slot of the arm support and cooperable with said clamping means to retain said supporting arm in fixed position, whereby said arm support is adjustable vertically and angularly relative to said clamping means to accommodate the mounting to variations in spacing between the pan and bumper bar support and variations in angular relationships of bumper bar support and pan.

4. A mounting for a light to a bumper construction employing a bumper bar support and a sheet metal pan disposed above the support, said mounting comprising; a light bracket arm disposable above the pan; an arm supporting member disposable beneath the pan; means for clamping said member and bracket arm together in relatively adjusted position; clamping means, including a member attachable to the bumper bar support; and means for retaining said arm supporting member in both vertically and angularly variable adjustable positions relative to said clamping member including an elongated slot in one of said members and a securing bolt extending therethrough to the other of said members.

CLIFFORD SKLAREK.

REFERENCES CITED

The following references are of record in the file of this patent:

UNITED STATES PATENTS

| Number | Name | Date |
| --- | --- | --- |
| 1,706,459 | Neuner | Mar. 26, 1929 |
| 2,344,683 | Dow | Mar. 21, 1944 |